United States Patent

Kraushaar-Czarnetzki et al.

Patent Number: 5,294,429
Date of Patent: *Mar. 15, 1994

[54] CRYSTALLINE ALUMINOPHOSPHATES

[75] Inventors: Bettina Kraushaar-Czarnetzki; Hermanus Jongkind; Ronald J. Dogterom, all of Amsterdam, Netherlands

[73] Assignee: Shell Oil Company, Houston, Tex.

[*] Notice: The portion of the term of this patent subsequent to Apr. 7, 2009 has been disclaimed.

[21] Appl. No.: 956,239

[22] Filed: Oct. 5, 1992

[30] Foreign Application Priority Data

Oct. 24, 1991 [EP] European Pat. Off. ......... 91202772.9

[51] Int. Cl.$^5$ ............................................. C01B 33/34
[52] U.S. Cl. ....................................... 423/708; 423/718; 423/DIG. 30; 502/208; 502/214
[58] Field of Search ................ 423/708, 718, DIG. 30

[56] References Cited

U.S. PATENT DOCUMENTS

| | | | |
|---|---|---|---|
| 4,880,611 | 11/1989 | von Ballmoos et al. | 423/DIG. 30 |
| 4,898,722 | 2/1990 | Derouane et al. | 423/DIG. 30 |
| 5,013,535 | 5/1991 | Bedard et al. | 423/277 |
| 5,091,073 | 2/1992 | Cheng et al. | 423/DIG. 30 |
| 5,102,642 | 4/1992 | Clark et al. | 423/708 |

FOREIGN PATENT DOCUMENTS

380825A2  8/1990  European Pat. Off. .
 43562    7/1991  European Pat. Off. .

*Primary Examiner*—Asok Pal

[57] ABSTRACT

The present invention relates to crystalline aluminophosphates having in the as-synthesized anhydrous form an X-ray diffraction pattern containing at least the lines given in Table A.

TABLE A

| d (Å) | Intensity (I/I$_0$) |
|---|---|
| 17.5 ± 0.2 | vs |
| 8.45 ± 0.2 | s/vs |
| 5.35 ± 0.1 | w/m |
| 4.62 ± 0.1 | w/m |
| 3.70 ± 0.05 | m |
| 3.52 ± 0.03 | m |
| 3.41 ± 0.03 | m/s |

The invention further relates to a process for preparing the crystalline aluminophosphates, using a substituted diamine as an organic template, under specified reaction conditions.

22 Claims, No Drawings

CRYSTALLINE ALUMINOPHOSPHATES

FIELD OF THE INVENTION

The present invention relates to crystalline aluminophosphates and a process for preparing such crystalline aluminophosphates.

BACKGROUND OF THE INVENTION

Crystalline aluminophosphates are well known materials which find a promising reception in industry as new generations of molecular sieves, catalyst carriers as well as catalysts.

Crystalline aluminophosphates include, inter alia, crystalline compounds in the $SAPO_4$ (siliconaluminophosphate), $MeAPO_4$ (metalloaluminophosphate) and $ElAPO_4$ (non-metal substituted aluminophosphate) families.

In European Patent No. 43 562 the preparation of various crystalline aluminophosphates is described from starting mixtures containing inter alia organic structure directing or templating agents. In Example 51 of said patent specification it is described that an aluminophosphate, designated $AlPO_4$-21, can be prepared by keeping a starting mixture, comprising N,N,N',N'-tetramethyl ethylene diamine, at a temperature of 200° C. for 168 hours.

It has now been found that novel crystalline aluminophosphates, e.g. of the $SAPO_4$ and $MeAPO_4$-type, may be prepared from starting mixtures when use is made of the appropriate forming components, the required forming conditions and the appropriate organic template.

SUMMARY OF THE INVENTION

The present invention relates to novel crystalline aluminophosphates having in the as-synthesized anhydrous form an X-ray diffraction pattern containing at least the lines given in Table A.

TABLE A

| d (Å) | Intensity ($I/I_0$) |
|---|---|
| 17.5 ± 0.2 | vs |
| 8.45 ± 0.2 | s/vs |
| 5.35 ± 0.1 | w/m |
| 4.62 ± 0.1 | w/m |
| 3.70 ± 0.05 | m |
| 3.52 ± 0.03 | m |
| 3.41 ± 0.03 | m/s |

(v)w = (very) weak, m = moderate, (v)s = (very) strong d (Å) = $d_{hkl}$ spacing in Angstrom ($10^{-10}$ m). Intensity ($I/I_0$) = intensity of peaks in X-ray diffraction pattern relative to the strongest peak. In numerical terms, w = 0–24, m = 25–60, s = 61–85, vs = 86–100.

The invention further relates to a process for preparing the crystalline aluminophosphates, using a substituted diamine as an organic template, under specified reaction condition.

DESCRIPTION OF THE PREFERRED EMBODIMENTS

In addition to the novel crystalline aluminophosphates described above, the present invention, in particular, relates to novel crystalline aluminophosphates having in the as-synthesized anhydrous form an X-ray diffraction pattern containing at least the lines given in Table I.

TABLE I

| d (Å) | Intensity ($I/I_0$) |
|---|---|
| 17.5 ± 0.2 | vs |
| 8.7 ± 0.2 | w/m |
| 8.45 ± 0.2 | s/vs |
| 5.35 ± 0.1 | w/m |
| 4.62 ± 0.1 | w/m |
| 4.41 ± 0.05 | w |
| 4.26 ± 0.05 | m |
| 3.98 ± 0.05 | m |
| 3.70 ± 0.05 | m |
| 3.52 ± 0.03 | m |
| 3.41 ± 0.03 | m/s |
| 2.91 ± 0.03 | w/m |

Crystalline aluminophosphates of the present invention are further characterized in that they have in the as synthesized anhydrous form a chemical composition $mR(X_nY_rAl_qP_x)O_2$, wherein R represents a diamine of the general formula $R_2R_3N-R_1-NR_4R_5$, wherein $R_1$ represents a $C_2$ carbon chain which may contain one or more inert substituents and each of $R_2$, $R_3$, $R_4$ and $R_5$ represents a hydrogen atom or a methyl or ethyl group which methyl or ethyl group may contain one or more inert substituents, and wherein $R_2+R_3+R_4+R_5$ comprise at least two of methyl and/or ethyl groups, X represents one or more elements which may substitute for P, Y represents one or more elements which may substitute for Al, wherein $m = 0.03$–$0.2$ $n = 0$–$0.4$ $r = 0$–$0.4$ $q = 0.3$–$0.6$ $x = 0.3$–$0.6$ and wherein $n+r+q+x=1$.

In the event that $n>0$ and/or $r>0$, it will be appreciated that the as-synthesized anhydrous form also contains an appropriate charge-balancing cation, such as a proton or a protonated form of the organic template R.

It should be understood that the as-synthesized anhydrous form referred to in this specification may also contain chemically bound water as the case may be.

Although the elements denoted X have a preference for substituting P, and the elements denoted Y have a preference for substituting Al, it is to be noted that some of the elements X and Y may substitute the non-preferred elements Al and P respectively. This is especially true for elements denoted X.

Preferably, crystalline aluminophosphates of the present invention are characterized in that they have, in the as-synthesized anhydrous form, a chemical composition wherein $m = 0.05$–$0.15$ $n = 0$–$0.4$ $r = 0$–$0.2$ $q = 0.3$–$0.6$ and $x = 0.3$–$0.6$.

Typically, X represents one or more tetra- or pentavalent elements. Preferably, X represents one or more elements chosen from the group of Si, Ge, As and V. More preferably, X represents one or more elements chosen from the group of V and Si.

Typically, Y represents one or more di- or trivalent elements. Preferably, Y represents one or more elements chosen from the group of Mg, Co, Mn, Zn, Fe, Ni, Cr and Ga. More preferably, Y represents one or more elements chosen from the group of Co and Mg.

Typically, R represents an ethylene diamine of the general formula $R_2R_3N-CH_2-CH_2-NR_4R_5$, wherein each of $R_2$, $R_3$, $R_4$ and $R_5$ represents a methyl or ethyl group. Preferably, R represents N,N,N',N'-tetramethyl ethylene diamine.

The invention also relates to crystalline aluminophosphates having in the substantially R-free form the general chemical composition $(X_nY_rAl_qP_x)O_2$, wherein X, Y, n, r, q and x have the meaning as described hereinabove, and wherein $n+r+q+x=1$.

The invention further relates to a process for preparing crystalline aluminophosphates from a starting mixture comprising a source of aluminum, a source of phosphorus, a source of a diamine as defined hereinbefore, and optionally a source of at least one component X and/or Y, keeping the starting mixture at a temperature of from 100° to 160° C. for a synthesis time sufficient to form crystalline aluminophosphate followed by separating off the crystalline aluminophosphate and drying, in which starting mixture the various components are initially present in the following molar ratios:

R: $(Al+P+X+Y)=0.1-0.3$
X: Al=0-1
Y: Al=0-1
P: Al=0.5-2
$H_2O$: Al=5-500, wherein R, X and Y have the meanings as defined hereinbefore.

Preferably, a starting mixture is used wherein the various components are initially present in the following molar ratios:

R: $(Al+P+X+Y)=0.15-0.25$
X: Al=0-0.5
Y: Al=0-0.4
P: Al=0.6-1.6
$H_2O$: Al=10-100.

Preferably, the synthesis time is kept in the range of from 10 to 150 hours, more preferably of from 10 to 120 hours.

The process is preferably carried out by keeping the starting mixture at a temperature of from 110° to 160° C., more preferably of from 130° to 160° C.

It will be understood that at relatively low starting mixture temperatures the synthesis time will be rather long and vice versa. It will be understood that the optimal process conditions can be chosen within the ranges as mentioned hereinabove. Higher temperatures and/or longer synthesis times than those envisaged in the process according to the present invention will result in the formation of unwanted products such as $AlPO_4$-21.

For preparing the starting mixture, any source or promoter form based on a diamine as defined hereinbefore can be used as a template and/or structure directing agent, such as a quaternary ammonium compound of such diamine, which source or promoter should be such that it can be converted into the appropriate diamine.

The process according to the present invention may be carried out at autogenous pressure as well as at elevated pressure.

Examples of suitable aluminum sources comprise aluminum salts, aluminum (hydr)oxides, such as gamma and theta alumina, gibbsite, boehmite, pseudo-boehmite and aluminum alkoxides, such as aluminum triisopropoxide and mixtures of various aluminum sources. Typically, boehmite or pseudo-boehmite is used as an alumina source.

Examples of suitable phosphorus sources comprise phosphorus acids and derivatives thereof such as esters, phosphorus oxides, phosphates and phosphites and mixtures of various phosphorus sources. Typically, phosphoric acids are used as a phosphorus source.

Examples of suitable sources of X and/or Y comprise the appropriate chlorides, iodides, bromides, nitrates, sulfates, oxides, hydroxides, alkoxides and acetates, preferably acetates, alkoxides and/or oxides.

It has been found that agitation during crystallization can be applied advantageously to produce the desired crystalline aluminophosphates from the starting mixture.

If desired, the organic template R may be removed substantially by thermal treatment and/or by suitable wet chemical oxidation reactions means, such as a hydrogen peroxide treatment, to obtain crystalline aluminophosphates substantially free of organic template R.

The crystalline aluminophosphates according to the present invention may be used as molecular sieves, catalysts or as catalyst carriers in the operation of various catalytic processes. If desired, one or more (catalytically) active species, in particular protons and/or precursors thereof and/or one or more metal(s) compounds of Group I, II, III and/or the Transition Metals and/or Rare Earth metals and/or precursors thereof, can be introduced into the crystalline alumino- phosphates according to the present invention.

They can be introduced by well known techniques such as, for instance, impregnation and ion-exchange.

Alternatively, the crystalline aluminophosphates of the present invention may be used as molecular sieves in separation processes.

The invention will now be illustrated by means of the following Examples.

EXAMPLE I

A crystalline $AlPO_4$, referred to as SCS-24, was prepared by mixing 9.3 grams of pseudoboehmite (Catapal B) as alumina source, 15.4 grams of 85% ortho-phosphoric acid, 7.7 grams of N,N,N',N'-tetramethyl ethylene diamine and 45.6 grams of water, giving a starting mixture composition on a molar basis of 1 $Al_2O_3$:1 $P_2O_5$:1 R:45 $H_2O$. After homogenation, the starting mixture was transferred to a rotating teflon-lined autoclave where it was kept at 140° C. under autogenous pressure for a period of 72 hours.

After synthesis, the crystalline compound produced was separated from the mother liquor by centrifugation, water washed and dried.

The crystalline compound obtained, had in the anhydrous form the chemical composition 0.11 R $(Al_{0.5}P_{0.5})O_2$ and an X-ray diffraction pattern containing the lines given in Table II.

TABLE II

| d (Å) | Intensity (I/I₀) |
|---|---|
| 17.55 | 100 |
| 8.70 | 45 |
| 8.44 | 85 |

TABLE II-continued

| d (Å) | Intensity (I/I₀) |
| --- | --- |
| 6.18 | 14 |
| 5.504 | 25 |
| 5.347 | 21 |
| 4.620 | 19 |
| 4.408 | 10 |
| 4.255 | 52 |
| 3.977 | 49 |
| 3.698 | 40 |
| 3.515 | 47 |
| 3.409 | 60 |
| 2.906 | 20 |
| 2.875 | 20 |

EXAMPLE II TO V

The experiment described in Example I was repeated but applying the synthesis temperatures and times as indicated in Table III.

TABLE III

| Example | Synthesis Time [h] | Synthesis Temp. [°C.] | XRD Product |
| --- | --- | --- | --- |
| II | 72 | 130 | SCS-24 |
| III | 72 | 150 | SCS-24 |
| IV | 24 | 160 | SCS-24 |
| V | 72 | 180 | AlPO₄-21 |

The experiments described in Examples II, III and IV yielded SCS-24 having essentially the same lines in its X-ray diffraction pattern as shown in Table II. The comparative experiment described in Example V yielded AlPO₄-21. It can be seen that at synthesis temperatures and times lying within the scope of the present invention, a product (SCS-24) in accordance with the present invention is obtained. For example, at a synthesis temperature of 160° C. and a synthesis time of 24 hours a beautiful crystalline SCS-24 is obtained. However, as shown in Example V, at a synthesis temperature outside the range as claimed in the present invention AlPO₄-21 is obtained.

EXAMPLE VI

The experiment described in Example I was repeated but using a starting mixture composition on a molar basis of 0.8 Al₂O₃:1 P₂O₅:1 R: 45 H₂O. After working up (synthesis, separation, washing, drying) SCS-24 was obtained having essentially the same lines in its X-ray diffraction pattern as shown in Table II.

EXAMPLE VII

The experiment described in Example I was repeated but using a starting mixture composition on a molar basis of 1 Al₂O₃:1 P₂O₅: 0.5 R:45 H₂O and applying a synthesis temperature of 120° C. After working up SCS-24 was obtained together with a substantial amount of an aluminophosphate having the tridymite crystal structure, the former having essentially the same lines in its X-ray diffraction pattern as shown in Table II.

EXAMPLE VIII

A crystalline CoAlPO₄ was prepared by repeating the experiment described in Example I but with the addition of cobalt acetate tetrahydrate, to yield a starting mixture composition on a molar basis of 0.15 CoO: 1 Al₂O₃:1 P₂O₅:1 R:45 H₂O.

The crystalline compound obtained, had in the anhydrous form the chemical composition 0.10 R (Co$_{0.03}$Al$_{0.47}$P$_{0.5}$)O₂ and an X-ray diffraction pattern containing essentially the same lines as given in Table II.

EXAMPLE IX

A crystalline SAPO₄ was prepared by repeating the experiment described in Example I but with the addition of silica gel to yield a starting mixture composition on a molar basis of 0.5 SiO₂:1 Al₂O₃: 1 P₂O₅:1 R:45 H₂O.

The crystalline compound obtained, had in the anhydrous form the chemical composition 0.11 R (Si$_{0.13}$Al$_{0.45}$P$_{0.42}$)O₂ and an X-ray diffraction pattern containing essentially the same lines as given in Table II.

EXAMPLE X

A crystalline SAPO₄ was prepared by repeating the experiment described in Example I but with the addition of tetraethyl orthosilicate to yield a starting mixture composition on a molar basis of 0.5 SiO₂: 1 Al₂O₃:1 P₂O₅:1 R:45 H₂O.

The crystalline compound obtained, had in the anhydrous form the chemical composition 0.12 R (Si$_{0.05}$Al$_{0.47}$P$_{0.48}$)O₂ and an X-ray diffraction pattern containing essentially the same lines as given in Table II.

What is claimed is:

1. Crystalline aluminophosphates having in the as-synthesized anhydrous form the chemical composition $mR(X_nY_rAl_qP_x)O_2$ wherein R is a diamine, X comprises one or more elements which substitute for P, Y comprises one or more elements which substitute for Al, $m=0.03-0.2$, $n=0-0.4$, $r=0-0.4$, $q=0.3-0.6$, $x=0.3-0.6$, $n+r+q+x=1$, and displaying an X-ray diffraction pattern containing at least the lines given in Table A

TABLE A

| d (Å) | Intensity (I/I₀) |
| --- | --- |
| 17.5 ± 0.2 | vs |
| 8.45 ± 0.2 | s/vs |
| 5.35 ± 0.1 | w/m |
| 4.62 ± 0.1 | w/m |
| 3.70 ± 0.05 | m |
| 3.52 ± 0.03 | m |
| 3.41 ± 0.03 | m/s | wherein w=weak, m=moderate, (v)s=(very) strong, d(Å)=$d_{hkl}$ spacing in Angstrom ($10^{-10}$ m) and Intensity (I/I₀)=intensity of peaks in X-ray diffraction pattern relative to the strongest peak.

2. The crystalline aluminophosphate of claim 1, having in the as-synthesized anhydrous form an X-ray diffraction pattern containing at least the lines given in Table I

TABLE I

| d (Å) | Intensity (I/I₀) |
| --- | --- |
| 17.5 ± 0.2 | vs |
| 8.7 ± 0.2 | w/m |
| 8.45 ± 0.2 | s/vs |
| 5.35 ± 0.1 | w/m |
| 4.62 ± 0.1 | w/m |
| 4.41 ± 0.05 | w |
| 4.26 ± 0.05 | m |
| 3.98 ± 0.05 | m |
| 3.70 ± 0.05 | m |
| 3.52 ± 0.03 | m |
| 3.41 ± 0.03 | m/s |
| 2.91 ± 0.03 | w/m | wherein w=weak, m=moderate, (v)s=(very) strong, d(Å)=$d_{hkl}$ spacing in Angstrom ($10^{-10}$ m) and Intensity ($I/I_0$) = intensity of peaks in X-ray diffraction pattern relative to the strongest peak.

3. The crystalline aluminophosphates of claim 1, having in the as-synthesized anhydrous form the chemical composition $mR(X_nY_rAl_qP_x)O_2$, wherein R represents a diamine of the general formula $R_2R_3N-R_1-NR_4R_5$, wherein $R_1$ represents a $C_2$ carbon chain which may contain one or more inert substituents and each of $R_2$, $R_3$, $R_4$ and $R_5$ represents a hydrogen atom or a methyl or ethyl group which methyl or ethyl group may contain one or more inert substituents, and wherein $R_2+R_3+R_4+R_5$ comprise at least two of methyl and/or ethyl groups, X represents one or more elements which may substitute for P, Y represents one or more elements which may substitute for Al, wherein $m = 0.03-0.2$ $n = 0-0.4$ $r = 0-0.4$ $q = 0.3-0.6$ $x = 0.3-0.6$ and wherein $n + r + q + x = 1$.

4. The crystalline aluminophosphates of claim 3, wherein $m = 0.05-0.15$ $n = 0-0.4$ $r = 0-0.2$ $q = 0.3-0.6$ and $x = 0.3-0.6$.

5. The crystalline aluminophosphates of claim 3 wherein X represents one or more tetra- or pentavalent elements.

6. The crystalline aluminophosphates of claim 1, wherein X represents one or more elements chosen from the group of V and Si.

7. The crystalline aluminophosphates claim 3, wherein Y represents or more di- or trivalent elements.

8. The crystalline aluminophosphates of claim 1, wherein Y represents one or more elements chosen from the group of Co and Mg.

9. The crystalline aluminophosphates of claim 3, wherein R represents an ethylene diamine of the general formula $R_2R_3N-CH_2-CH_2-NR_4R_5$, wherein each of $R_2$, $R_3$, $R_4$ and $R_5$ represents a methyl or ethyl group.

10. The crystalline aluminophosphates of claim 9, wherein R represents N,N',N'-tetramethyl ethylene diamine.

11. A process for preparing the crystalline aluminophosphates of claim 1, from a starting mixture comprising a source of aluminum, a source of phosphorus, a source of a diamine having the general formula $R_2R_3N-R_1NR_4R_5$, wherein $R_1$ represents a $C_2$ carbon chain which may contain one or more inert substituents and each of $R_2$, $R_3$, $R_4$ and $R_5$ represents a hydrogen atom or a methyl or ethyl group which methyl or ethyl group may contain one or more inert substituents, and wherein $R_2+R_3+R_4+R_5$ comprise at least two of methyl and/or ethyl groups, and optionally a source of at least one component X and/or Y, keeping the starting mixture at a temperature of from 100° to 160° C. for a synthesis time sufficient to form a crystalline aluminophosphate followed by separating off the crystalline aluminophosphate obtained and drying, in which starting mixture the various components are initially present in the following molar ratios:

R: (Al+p+X+Y) = 0.1–0.3
X: Al 0–1
Y: Al 0–1
P: Al 0.5–2 and
$H_2O$: Al 5–500.

12. The process of claim 11, wherein the starting mixture the various components are initially present in the following molar ratios:

R: (Al+P+X+Y) = 0.15–0.25
X: Al = 0–0.5
Y: Al = 0–0.4
P: Al = 0.6–1.6
$H_2O$: Al = 10–100.

13. The process of claim 11, wherein the synthesis time is kept in the range from 10 to 150 hours.

14. The process of claim 13, wherein the synthesis time is kept in the range of from 10 to 120 hours.

15. The process of claims 11, wherein the starting mixture is kept at a temperature of from 110° to 160° C. preferably of from 130° to 160° C.

16. The process of claims 15, wherein the starting mixture is kept at a temperature of from 130° to 160° C.

17. The process of claim 11, wherein in the diamine each of $R_2$, $R_3$, $R_4$ and $R_5$ represents a methyl or ethyl group.

18. The process of claim 17, wherein N,N,N',N'-tetramethyl ethylene diamine is used as organic template R.

19. The process of claims 11, wherein aluminum salts, aluminum oxides, aluminum hydroxides or aluminum alkoxides are used as aluminum source.

20. The process of claim 19, wherein boehmite or pseudoboehmite is used as an aluminum source.

21. The process of claim 11, wherein phosphorus acids, phosphorus oxides, phosphates or phosphites are used as a phosphorus source.

22. The process of claim 11, wherein the organic template R is removed substantially by thermal treatment and/or by wet chemical oxidation reaction means, to obtain crystalline aluminophosphates substantially free of organic template R.

* * * * *